United States Patent
Itoh et al.

(10) Patent No.: US 6,770,349 B2
(45) Date of Patent: Aug. 3, 2004

(54) SANDWICH STRUCTURE AND METHOD OF REPAIRING THE SAME

(75) Inventors: Toru Itoh, Seki (JP); Shunichi Bandoh, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/636,566

(22) Filed: Aug. 8, 2003

(65) Prior Publication Data

US 2004/0028877 A1 Feb. 12, 2004

Related U.S. Application Data

(62) Division of application No. 09/628,726, filed on Jul. 28, 2000.

(30) Foreign Application Priority Data

Jul. 30, 1999 (JP) .............................. 11-217765

(51) Int. Cl.[7] ................................ B32B 3/00
(52) U.S. Cl. .................... 428/73; 428/71; 428/116; 428/117; 428/156; 428/158; 428/159; 428/160; 428/161; 428/304.4; 428/309.9; 428/317.1; 428/314.4; 428/223; 428/297.4; 29/897; 29/897.1; 29/897.2; 29/897.3; 29/897.32; 29/402.01; 29/402.09; 29/402.11; 29/402.12; 29/402.14; 29/505; 29/525.01; 29/525.06; 29/525.07
(58) Field of Search ................. 428/116, 117, 428/118, 73, 71, 156, 158–160, 161, 304.4, 309.9, 317.1, 297.4, 314.4, 223; 29/592, 897, 897.1, 897.2, 897.3, 897.32, 402.01, 402.09, 402.11, 402.12, 402.14, 505, 525.01, 525.05, 525.06, 525.07

(56) References Cited

U.S. PATENT DOCUMENTS

| 3,619,344 A | 11/1971 | Wolinski et al. |
| 4,120,712 A | 10/1978 | Sindt |
| 4,351,873 A | 9/1982 | Davis |

(List continued on next page.)

FOREIGN PATENT DOCUMENTS

| FR | 2 525 849 A1 | 10/1983 |
| GB | 2 032 843 A | 5/1980 |
| JP | 06-173170 A | 6/1994 |
| WO | Wo 87/03842 | 7/1987 |

Primary Examiner—Deborah Jones
Assistant Examiner—Wendy Boss
(74) Attorney, Agent, or Firm—Oliff & Berridge, PLC

(57) ABSTRACT

A sandwich structure does not permit the permeation of water and a sandwich structure repairing method is capable of easily repairing the sandwich structure. A sandwich structure (1) includes a core (4) formed of a closed-cell foam plastic material, and surface plates (2, 3) formed of a fiber-reinforced composite material containing hydrophobic inorganic fibers as reinforcing fibers and bonded to the opposite surfaces of the core (4). Water is unable to permeate the sandwich structure. When the outer surface plate (2) of the sandwich structure (1) is damaged, a damaged portion of the outer surface plate (2) is removed to form a circular opening (10) in the outer surface plate (2), a portion of the core (4) in the vicinity of the circular opening (10) is removed by shot blasting work, a support plate (16) provided with radial arms (18) is fastened to the inner surface of the outer surface plate (2) with rivets (25) at a position corresponding to the circular opening (10), a circular cover plate (40) is fitted in the opening (10) so as to be seated on the support plate (16) and is fastened to the support plate (16) with rivets (25). A cavity formed by removing the portion of the core (4) is filled up with a filling material (43).

14 Claims, 6 Drawing Sheets

U.S. PATENT DOCUMENTS

| | | | |
|---|---|---|---|
| 4,557,961 A | | 12/1985 | Gorges |
| 4,687,691 A | * | 8/1987 | Kay .......................... 428/73 |
| 4,749,601 A | | 6/1988 | Hillinger |
| 5,462,623 A | | 10/1995 | Day |
| 5,481,091 A | | 1/1996 | Grimm et al. |
| 5,484,500 A | * | 1/1996 | Kaufmann et al. ......... 156/198 |
| 5,580,502 A | * | 12/1996 | Forster et al. ............. 264/46.5 |
| 5,589,016 A | * | 12/1996 | Hoopingarner et al. ....... 156/87 |
| 5,667,867 A | | 9/1997 | Meier et al. |
| 5,915,469 A | | 6/1999 | Abramzon et al. |

\* cited by examiner

SANDWICH STRUCTURE AND METHOD OF REPAIRING THE SAME

This is a Divisional of application Ser. No. 09/628,726 filed Jul. 28, 2000, which in turn claims priority of foreign application No. 11-217765 filed Jul. 30, 1999 in Japan. The entire disclosure of the prior application is hereby incorporated by reference herein in its entirety.

BACKGROUND OF THE INVENTION

1. Field of the Invention

The present invention relates to a sandwich structure to be used as a structural member of aircraft, rolling stock, automobiles and ships, and a method of repairing such a sandwich structure.

2. Description of the Related Art

Lightweight, reinforced metal plates of aluminum alloys have been used for forming structural members of aircraft and the like. Recently, reinforced, plate structures of a composite material and sandwich structures formed by laminating a honeycomb core between surface plates of a composite material have been prevalently used. The surface plates of a composite material are bonded to the honeycomb core with adhesive films. Usually, cell elements of a honeycomb core are bonded together with a foaming adhesive that foams in a hot pressure molding process.

When a surface plate of a composite material is damaged and needs repairing, it is general to repair the damaged surface plate by scraping off a damaged part of the surface plat, laminating adhesive layers and prepreg sheets formed by impregnating a fiber structure with a resin in a recess formed by scraping off the damaged part so as to fill up the recess, and applying heat and pressure to the layers of the prepreg sheets and the adhesive to set the layers of the prepreg sheets.

When a sandwich structure having a honeycomb core sandwiched between surface plates is damaged, it sometimes occurs that water leaks into the sandwich structure through the periphery of the sandwich structure or cracks formed in the surface plate and water collects in the sandwich structure. The water collected in the honeycomb structure diffuses throughout the sandwich structure through the foam adhesive layers bonding together the cell elements of the honeycomb core. The adhesive film used for bonding together the surface plates and the honeycomb core includes a glass fabric, a cotton fabric or a meshed carrier of synthetic fibers. Therefore, small gaps are formed between the surface plates and the honeycomb core and it is possible that the water spreads through the gaps. If water collects in the honeycomb core and the honeycomb core is made of a metal, such as an aluminum alloy, the honeycomb core will be corroded and the surface plates will separate from the honeycomb core.

Even if the honeycomb core is made of a nonmetallic material, water collected in the honeycomb core repeats freezing and evaporation according to the variation of the ambient condition of the sandwich structure to deteriorate the adhesive bonding together the surface plates and the honeycomb core and to reduce the bonding strength of the adhesive and, consequently, the surface plates separates from the honeycomb core.

The water collected in the honeycomb core increases the weight of the sandwich structure, changes the position of the center of gravity of the sandwich structure adversely affecting the dynamic characteristic of the sandwich structure. In some cases, the sandwich structure is heated at a temperature not lower than 100° C. when repairing the damaged sandwich structure. If the honeycomb core contains water, the water evaporates to increase the pressure in the sandwich structure when the sandwich structure is heated and, in the worst case, the sandwich structure will burst.

If it is known that the honeycomb core contains water, small holes are formed in the surface plate and the water is drained through the small holes or the sandwich structure is unfastened and the water is removed by suction, which, however, needs time and costs.

When fabricating a sandwich structure having portions of different thicknesses, a honeycomb core must be machined, which requires troublesome work.

When repairing a damaged portion of a sandwich structure by laminating prepreg sheets, heat and pressure must be applied to the laminated prepreg sheets to set the prepreg sheets, which needs special devices. When setting prepreg sheets by applying heat and pressure thereto, pressure and temperature must be strictly controlled, which requires very troublesome work. After completing the repair of the damaged part of the sandwich structure by setting the prepreg sheets, the adhesive bonding the laminated prepreg sheets covering the damaged part to the mother structure of the repaired part must be inspected. Thus, the repair of the damaged sandwich structure needs special devices and much time and work.

SUMMARY OF THE INVENTION

Accordingly, it is an object of the present invention to provide a sandwich structure capable of inhibiting the penetration of water therein and having a core that can be easily processed and to provide a method of repairing a sandwich structure by simple work.

According to a first aspect of the present invention, a sandwich structure includes a core having foam plastic core members formed of a closed-cell foam plastic material, and surface plates formed of a fiber-reinforced composite material containing hydrophobic inorganic fibers as reinforcing fibers and covering the opposite surfaces of the core, wherein the foam plastic core members are bonded together with adhesive films that do not foam, and the surface plates are bonded to the core with adhesive films not containing any carrier or a component resin of the fiber-reinforced composite material forming the surface plates.

Since the sandwich structure is provided with the foam plastic core members of a closed-cell foam plastic material, water is unable to collect in the sandwich structure. Since the foam plastic core members are bonded together with an adhesive film that does not foam and the composite surface plates are bonded to the core with an adhesive film not having any carrier or a component resin of the fiber-reinforced composite material forming the composite surface plates, any passages through which water penetrates and diffuses into the sandwich structure are not formed at all. Consequently, the sandwich structure is free from troubles due to the penetration of water into the sandwich structure.

According to a second aspect of the present invention, a sandwich structure includes a core having foam plastic core members of a closed-cell foam plastic material and honeycomb core members, and surface plates formed of a fiber-reinforced composite material containing hydrophobic inorganic fibers as reinforcing fibers and covering the opposite surfaces of the core, wherein a peripheral part of the core is formed of the foam plastic core members arranged so as to surround the honeycomb core members, the foam plastic core members are bonded together with adhesive films that do not foam, and the surface plates are bonded to the core with adhesive films not containing any carrier or a component resin of the fiber-reinforced composite material forming the surface plates.

Since the peripheral part of the sandwich structure through which water is most liable to leak into the sandwich structure is formed of the foam plastic core members, the foam plastic core members are bonded together with an adhesive film that does not foam, and the surface plates are bonded to the core with adhesive films not containing any carrier or a component resin of the fiber-reinforced composite material forming the surface plates, the sandwich structure is free from troubles due to the penetration of water into the sandwich structure. Since the core has the honeycomb core members having strength and rigidity which are generally higher than those of the foam plastic core members, the sandwich structure has a high strength and a high rigidity.

According to a third aspect of the present invention, a sandwich structure includes a core having foam plastic core members formed of a closed-cell foam plastic material and honeycomb core members, and surface plates formed of a fiber-reinforced composite material containing hydrophobic inorganic fibers as reinforcing fibers and covering the opposite surfaces of the core, wherein the core is formed by sandwiching the honeycomb core members between the foam plastic core members and bonding the foam plastic core members to the honeycomb core members with adhesive films not containing any carrier.

Since the core is formed by sandwiching the honeycomb cores between the foam plastic core members and bonding the foam plastic core members to the honeycomb core members with an adhesive film not containing any carrier, water is unable to penetrate into the honeycomb core members and the sandwich structure even if the surface plate is fissured or broken. Since the core has the honeycomb core members having strength and rigidity which are generally higher than those of the foam plastic core members, the sandwich structure has a high strength and a high rigidity. Since the foam plastic core members capable of readily absorbing shocks are contiguous with the surface plates, the sandwich structure is resistant to damaging actions.

According to a fourth aspect of the present invention, a sandwich structure includes a core having foam plastic core members formed of a closed-cell foam plastic material and honeycomb core members, and surface plates formed of a fiber-reinforced composite material containing hydrophobic inorganic fibers as reinforcing fibers and covering the opposite surfaces of the core, wherein portions of the core corresponding to portions of the sandwich structure where thickness varies sharply are formed of the foam plastic core members, portions of the core corresponding to portions of the sandwich structure where thickness varies gradually are formed of the honeycomb core members, and the composite surface plates are bonded to the core with adhesive films not containing any carrier or a component resin of the fiber-reinforced composite material forming the surface plates.

Since the portions of the core corresponding to portions of the sandwich structure where thickness varies sharply are formed of the foam plastic core members capable of being easily processed and of being smoothly processed according to the variation of the thickness, the core can be easily processed and the composite surface plates can be easily bonded to the core.

According to a fifth aspect of the present invention, a sandwich structure repairing method of repairing a sandwich structure including a core having foam plastic core members formed of a closed-cell foam plastic material, and outer and inner surface plates of a fiber-reinforced composite material and bonded to the opposite surfaces of the core with an adhesive film not containing any carrier or a component resin of the composite surface plates includes the step of attaching a support plate to the inner surface of a damaged portion of the outer surface plate with rivets.

Since the support plate is attached to the inner surface of the outer surface plate, the repaired portion of the outer composite surface plate has a smooth surface. Since the support plate is attached to the outer composite surface plate by riveting work using rivets for repair instead of bonding work using an adhesive that requires time and labor, time and labor necessary for repairing the sandwich structure can be greatly reduced.

According to a sixth aspect of the present invention, a sandwich structure repairing method of repairing a sandwich structure comprising a core having foam plastic core members formed of a closed-cell foam plastic material, and an outer surface plate and an inner surface plate formed of a fiber-reinforced plastic material and bonded to the opposite surfaces of the core with adhesive films not containing any carrier or a component resin of the fiber-reinforced composite material forming the surface plates, said sandwich structure repairing method comprising the steps of: putting an outer support plate to an inner surface of a damaged portion of the outer surface plate; and fastening the outer support plate to the outer surface plate with rivets.

When an operator is able to perform repairing work on the side of the inner surface of the sandwich structure and the damage in the outer surface plate is slight, the outer support plate can be attached to the inner surface of the outer surface plate from the inner side of the sandwich structure with the rivets, and the cavity can be filled up with the filling material, and the inner support plate can be easily attached to the inner surface plate.

Preferably, a portion of the inner surface plate and a portion of the core corresponding to the damaged portion of the outer surface plate are removed; the outer support plate is fastened to the inner surface of the damaged portion of the outer surface plate with rivets; a cavity formed by removing the portion of the core is filled up with a filling material; and an inner support plate of a size greater than that of an opening in the inner surface plate formed by removing the portion of the inner surface plate is fastened to the inner surface plate with rivets so as to cover the opening in the inner surface plate.

When an operator is able to perform repairing work on the side of the inner surface of the sandwich structure, the portion of the outer surface plate including the damaged portion is removed to form the opening, the outer support plate is attached to the inner surface of the outer surface plate, the space formed by removing the portion of the core is filled up with the filling material, and the cover plate of the size equal to that of the opening in the outer surface plate is fitted in the opening in the outer surface plate and the cover plate is fastened to the support plate with rivets. Thus, the outer surface of the outer surface plate can be finished in a smooth surface. Since the method employs riveting work using rivets, time and labor for the repair work can be reduced.

Preferably, an opening is formed in the damaged portion of the outer surface plate; a portion of the core and a portion of the inner surface plate corresponding to the opening and a region around an edge of the opening are removed; the outer support plate is fastened to the inner surface of a portion of the outer surface plate around an edge of the opening in the outer surface plate with rivets; a cover plate formed of the same material as that forming the outer surface plate and having a thickness equal to that of the outer surface plate is fitted in the opening and is fastened to the outer support plate with rivets; a cavity formed in the core by removing the portion of the core is filled up with a filling material; and an inner support plate of a size greater than that of an opening in the inner surface plate formed by removing the portion of the inner surface plate is fastened to the inner surface plate with rivets so as to cover the opening in the inner surface plate.

Preferably, a portion of the outer surface plate including the damaged portion is removed to form an opening in the outer surface plate; a portion of the core corresponding to the opening in the outer surface plate and a portion of the core around an edge of the opening in the outer surface plate are removed; the outer support plate is expandable over a region greater than the opening in the outer surface plate; the outer support plate is inserted through the opening in the outer surface plate; the outer support plate is fastened to the inner surface of the outer surface plate with rivets; a cover plate of a size equal to that of the opening formed in the outer surface plate and of a thickness equal to that of the outer surface plate is fitted in the opening in the outer surface plate; the outer support plate is fastened to the support plate with rivets; and a cavity formed by removing the portions of the core is filled up with a filling material.

Since the expandable outer support plate is used, the outer surface of the outer surface plate can be finished in a smooth surface even if repairing work can be carried out only on the side of the outer surface of the sandwich structure.

Preferably, a plurality of the outer support plates ar used; a portion of the outer surface plate including the damaged portion is removed to form an opening in the outer surface plate; a portion of the core corresponding to the opening in the outer surface plate and a portion of the core around an edge of the opening in the outer surface plate are removed; the plurality of the outer support plates are inserted through the opening in the outer surface plate so as to be arranged on the inner surface of a portion of the outer surface plate around an edge of the opening in the outer surface plate; the plurality of the outer support plates are fastened to the inner surface of the outer surface plate with rivets; a cover plate of a size equal to that of the opening formed in the outer surface plate and of a thickness equal to that of the outer surface plate is fitted in the opening in the outer surface plate; the cover plate is fastened to the plurality of the outer support plates with rivets; and a cavity formed by removing the portions of the core is filled up with a filling material.

Since the plurality of the outer upport plates are used instead of the expandable outer support plate, complicated processing work for forming the expandable outer support plate is unnecessary and hence processing work can be reduced.

Preferably, the portions of the core of a foam plastic material corresponding to the opening in the outer surface plate and a region around the edge of the opening in the outer surface plate are removed by shot blasting work.

Since the sandwich structure has the core of a foam plastic material, the portions of the core can be easily removed by shot blasting work, which reduces time and labor necessary for repairing

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
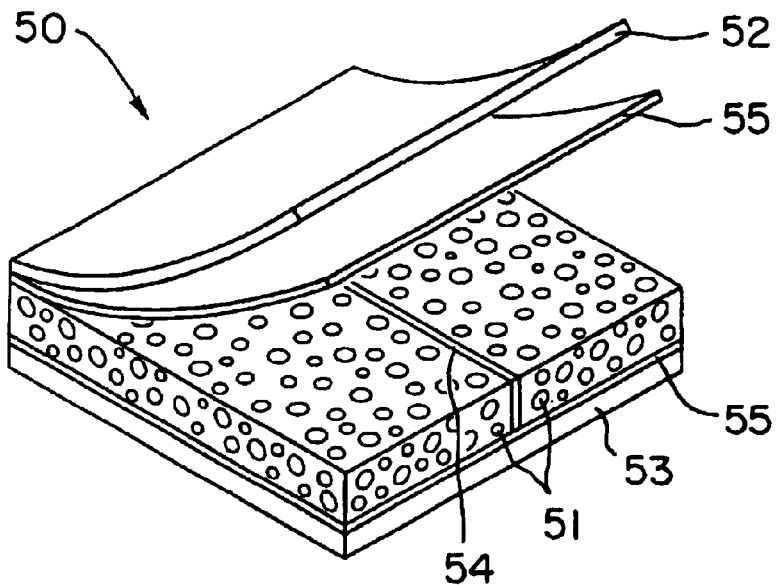
FIG. 1 is an exploded perspective view of a sandwich structure 50 in a first embodiment according to the present invention.

Referring to FIG. 1 showing a sandwich structure 50 in a first embodiment according to the present invention to be used as a skin of an aircraft, the sandwich structure 50 has a core including core members 51 of a closed-cell foam plastic material, and surface plates 52 and 53 of a fiber-reinforced composite material covering the opposite surfaces of the core, respectively. The closed-cell foam plastic material is, for example, a closed-cell foam polymethacrylimide (PMI) or a closed-cell foam polyvinyl chloride (PVC). The surface plates 52 and 53 are formed of a fiber-reinforced composite material containing hydrophobic inorganic fibers, such as carbon fibers, as reinforcing fibers. Each of the surface plates 52 and 53 is formed by laminating a plurality of prepreg sheets each formed by impregnating a sheet of the reinforcing fibers with an epoxy resin or the like.

The core members 51 are bonded together with an adhesive film 54 of an adhesive that does not foam, such as Cytec FM300K®. The surface plates 52 and 53 are bonded to the core members 51 with adhesive films 55 of an adhesive, such as Cytec FM300U®, not containing any carrier. The surface plates 52 and 53 can be bonded to the core members 51 without forming any gaps between the surface plates 52 and 53 and the core members 51 by the adhesive films 55. Consequently, water is unable to leak into the sandwich structure 50. The surface plates 52 and 53 may be bonded to the core members 51 by using the resin of the composite material forming the surface plates 52 and 53 instead of using the adhesive films 55. Prepreg sheets for forming the surface plates 52 and 53 may be superposed on the opposite surfaces of the opposite surfaces of the core consisting of the core members 51, and heat and pressure may be applied to the prepreg sheets for setting to bond the surface plates 52 and 53 to the core members 51.

Water is unable to penetrate into the core members 51 because the core members 51 are formed of the closed-cell foam plastic material. Since the core members 51 are bonded together with the adhesive film 54 of an adhesive that does not foam, water is unable to spread inside the sandwich structure 50 through the joint of the core members 51 even if the surface plate 52 or 53 is fissured.

Figure 2:
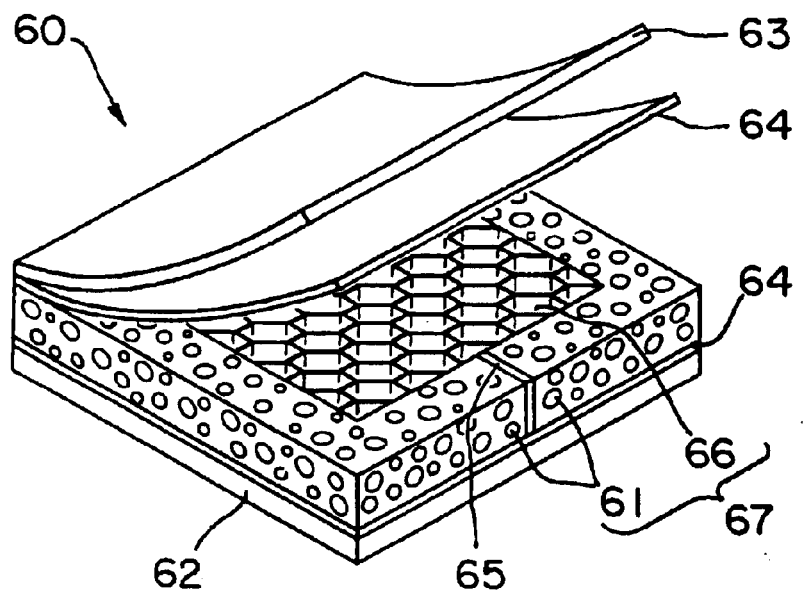
FIG. 2 is an exploded perspective view of a sandwich structure 60 in a second embodiment according to the present invention.

Referring to FIG. 2 showing a sandwich structure 60 in a second embodiment according to the present invention, the sandwich structure 60 has a core 67, and surface plates 62 and 63. The surface plates 62 and 63, similarly to the surface plates 52 and 53 of the sandwich structure 50 in the first embodiment, are formed of a fiber-reinforced composite material containing hydrophobic inorganic fibers as reinforcing fibers. The surface plates 62 and 63 are bonded to the opposite surfaces of the core 67 with adhesive films 64 not containing any carrier or with the resin of the fiber-reinforced composite material, respectively.

The core 67 has a honeycomb core member 66 and foam plastic core members 61 of a closed-cell plastic material surrounding the honeycomb core member 66 and bonded together with adhesive films 65 that do not foam. The honeycomb core member 66 has high strength and rigidity to withstand force that acts thereon in a direction along the thickness of the sandwich structure 60 and low strength and rigidity to withstand force that acts thereon in a direction perpendicular to the direction along the thickness of the sandwich structure 60. Therefore, when heating and pressing a sandwich structure provided with a honeycomb core, the sandwich structure must be placed in a metal locating jig having the shape of a frame or a peripheral part of the sandwich structure must be gently tapered to prevent the sandwich structure from being crushed by lateral pressure. Since the sandwich structure 60 is provided with the core 67 including the foam plastic core members 61 arranged in the shape of a frame so as to surround the honeycomb core member 66, the sandwich structure 60 has high strength to withstand lateral force, and a peripheral part of the sandwich structure 60 can be sharply tapered.

Figure 3:
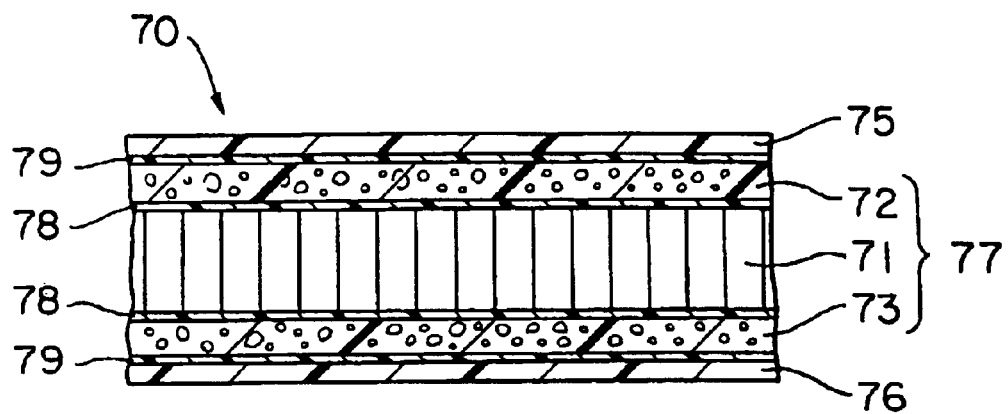
FIG. 3 is a fragmentary sectional view of a sandwich structure 70 in a third embodiment according to the present invention.

Referring to FIG. 3 showing a sandwich structure 70 in a third embodiment according to the present invention, the sandwich structure 70 has a core 77 including foam plastic core members 72 and 73 of a closed-cell foam plastic material and a honeycomb core member 71 sandwiched between the foam plastic core members 72 and 73, and surface plates 75 and 76 bonded to the opposite surfaces of the core 77, respectively. The foam plastic core members 72 and 73 are bonded to the honeycomb core member 71 with adhesive films 78 not containing any carrier. The surface plates 75 and 76 are bonded to the core 77 with adhesive films 79 not containing any carrier. The surface plates 75 and 76 are formed of a fiber-reinforced composite material containing hydrophobic inorganic fibers.

Because the honeycomb core member 71 is sandwiched between the foam plastic core members 72 and 73, water is unable to leak into the sandwich structure even if the surface plate 75 or 76 is fissured. Because the foam plastic members 72 and 73 capable of absorbing shocks are contiguous with the surface plates 75 and 76, the sandwich structure 70 is resistant to damaging actions.

Figure 4:
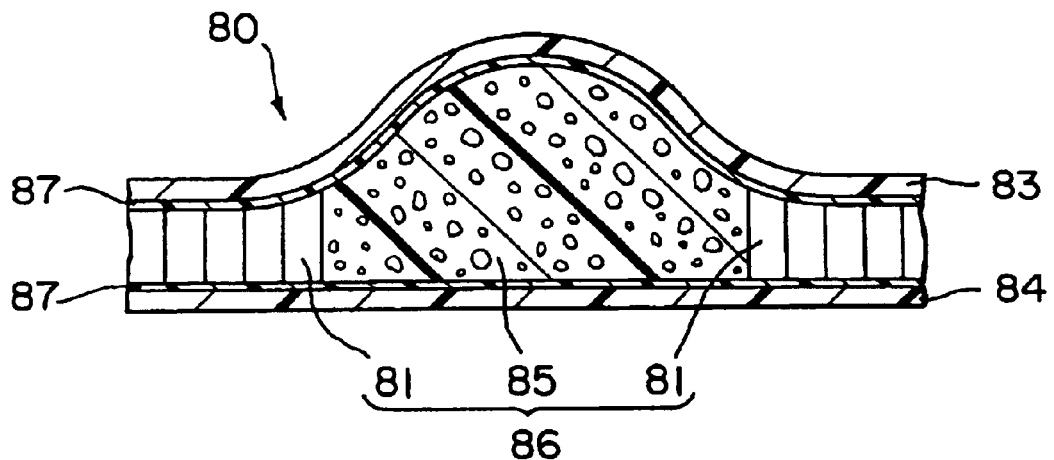
FIG. 4 is a fragmentary sectional view of a sandwich structure 80 in a fourth embodiment according to the present invention.

Referring to FIG. 4 showing a sandwich structure 80 in a fourth embodiment according to the present invention, the sandwich structure 80 has a core 86 including honeycomb core members 81 and a foam plastic core member 85, and surface plates 83 and 84. The honeycomb core members 81 are disposed in portions of the sandwich structure 80 in which the thickness of the sandwich structure 80 varies in a narrow range, and the foam plastic core member 85 is disposed in a portion of the sandwich structure 80 in which the thickness of the sandwich structure 80 varies in a wide range.

When forming a sandwich structure of varying thickness provided with a honeycomb core, the honeycomb core must be machined so as to conform to the varying thickness of the sandwich structure. The machining of the honeycomb core is a troublesome work. Therefore, the sandwich structure 80 in the fourth embodiment is provided with the core 86 including the honeycomb core members 81 disposed in portions of the sandwich structure 80 in which the thickness of the sandwich structure 80 varies in a narrow range, and the foam plastic core member 85 disposed in a portion of the sandwich structure 80 in which the thickness of the sandwich structure 80 varies in a wide range. The core 81 can be easily formed. The surface plates 83 and 84 are formed by laminating prepreg sheets on the core 86. The surface plates 83 and 84 are bonded to the core 86 with adhesive films 87 not containing any carrier. The surface plates 83 and 84 are formed of a fiber-reinforced composite material containing hydrophobic inorganic fibers.

Figure 5:
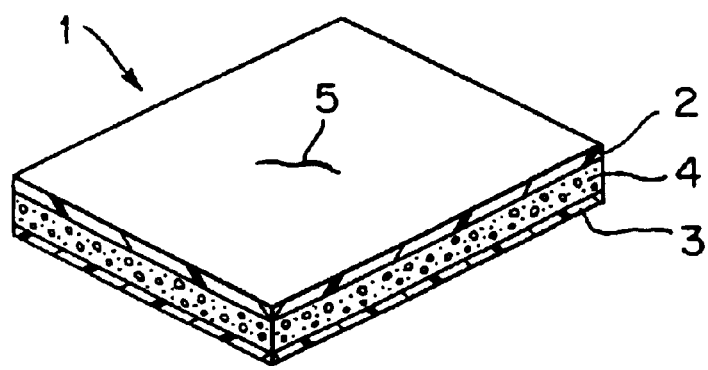
FIG. 5 is a perspective view of a damaged sandwich structure 1.

A sandwich structure repairing method in a fifth embodiment according to the present invention will be explained hereinafter. FIG. 5 shows a damaged sandwich structure 1. The sandwich structure 1 is a composite structure and has a flat core 4 of 12.7 mm in thickness and surface plates 2 and 3 covering the opposite surfaces of the core 4. The core 4 is formed of a closed-cell foam plastic material. The surface plates 2 and 3 are formed of a fiber-reinforced composite material containing hydrophobic inorganic fibers. The sandwich structure 1 is used as a skin of, for example, aircraft or rolling stock, such as a high-speed passenger car for a rapid train. The surface plates 2 and 3 serve as an outer surface plate and an inner surface plate, respectively.

The outer surface plate 2 is formed of a fiber-reinforced composite material formed by laminating eight prepreg sheets each formed by impregnating a sheet of reinforcing fibers with a resin. The inner surface plate 3 is formed of a fiber-reinforced composite material formed by laminating four prepreg sheets and is thinner than the outer surface plate 2.

Figure 6:
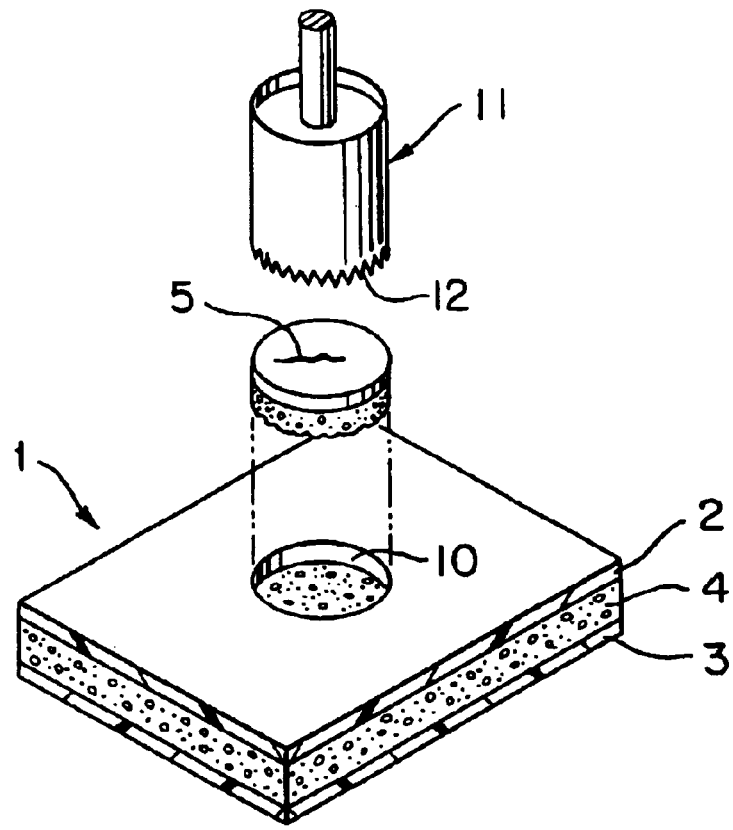
FIG. 6 is a perspective view of assistance in explaining a method of cutting out a damaged portion in a sandwich structure when repairing the sandwich structure by a sandwich structure repairing method according to the present invention.

As shown in FIG. 5, a fissure 5 is formed in the outer surface plate 2 of the sandwich structure 1 and the outer surface plate 2 needs repair. A portion of the outer surface plate 2 having the fissure 5 is cut out with a hole saw 11 as shown in FIG. 6 to form a round opening 10 in the outer surface plate 2. The hole saw 11 has the shape of a hollow cylinder with cutting teeth 12 around its edge. The hole saw 11 is rotated at a high rotating speed about its axis to cut a round hole. The hole saw 11 has a diameter greater than that of a circular region including the fissure 5 in the outer surface plate 2. Since the portion including the fissure 5 of the outer surface plate 2 is cut out in a circular shape, the intensity of stress concentration can be limited to a low level. The diameter of the hole saw 11 is, for example, 50 mm. As shown in FIG. 6, a cylindrical portion of the core 4 underlying the outer surface plate 2 is cut out together with the round portion of the outer surface plate 2, so that the round opening 10 is formed in the outer surface plate 2.

Figure 7:
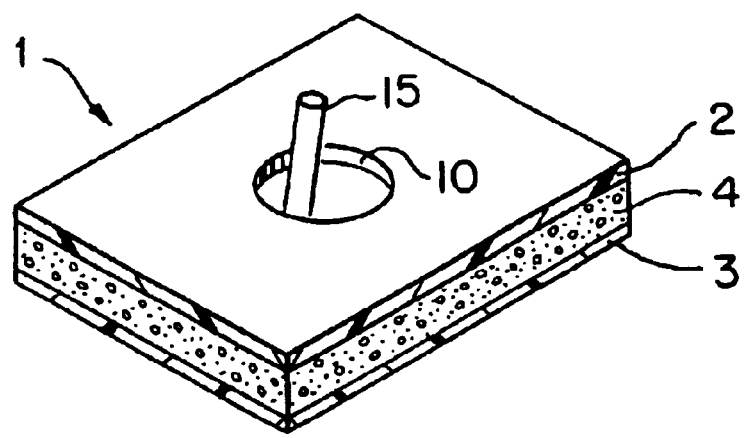
FIG. 7 is a perspective view of assistance in explaining a method of removing a portion of a core included in a sandwich structure.
Figure 8:
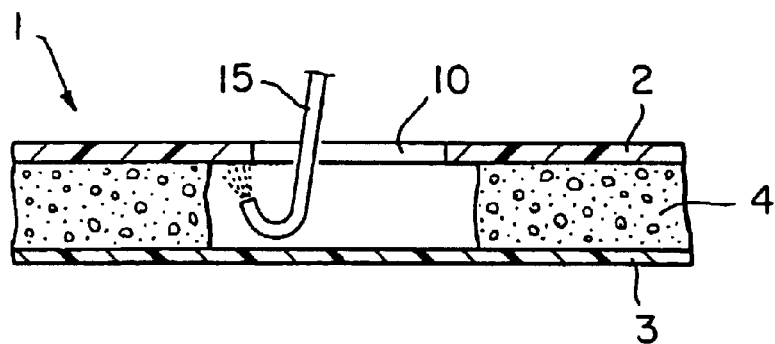
FIG. 8 is a sectional view of assistance in explaining a method of removing a portion of a core included in a sandwich structure.

FIGS. 7 and 8 are views of assistance in explaining work for removing portions of the core 4. Portions of the core 4 corresponding to the opening 10 and around the edge of the opening 10 are removed. Since the core 4 is formed of a closed-cell foam plastic material and the surface plates 2 and 3 are formed of a fiber-reinforced composite material, only the portions of the core 4 can be efficiently removed by shot blasting using shot, such as walnut power or particles of alumina or corn. The shot is blown through a nozzle 15 against the core 4 to scrape off portions of the core 4. An end portion of the nozzle 15 is bent substantially through an angle of 180° C. as shown in FIG. 8 to facilitate removing a portion of the core 4 around the edge of the opening 10 formed in the outer surface plate 2.

Figure 9:
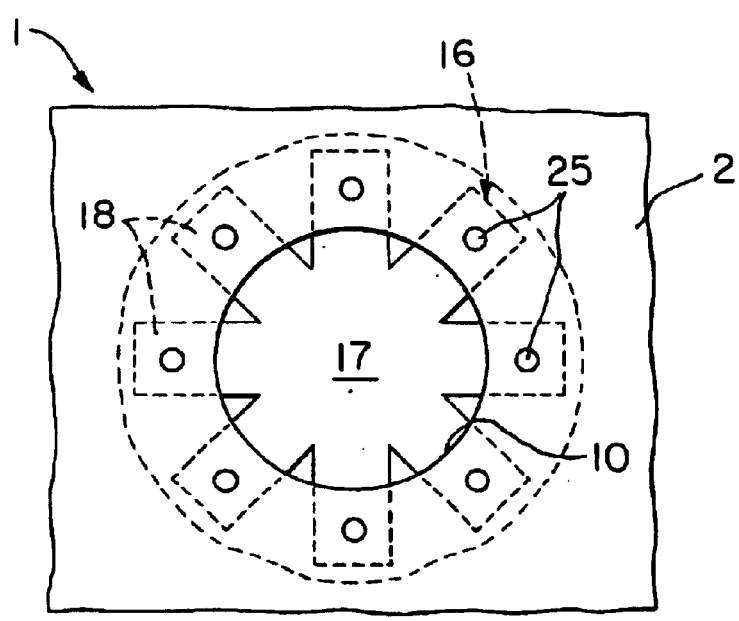
FIG. 9 is a fragmentary plan view of a sandwich structure with a support plate attached to an outer composite surface plate included therein.
Figure 10:
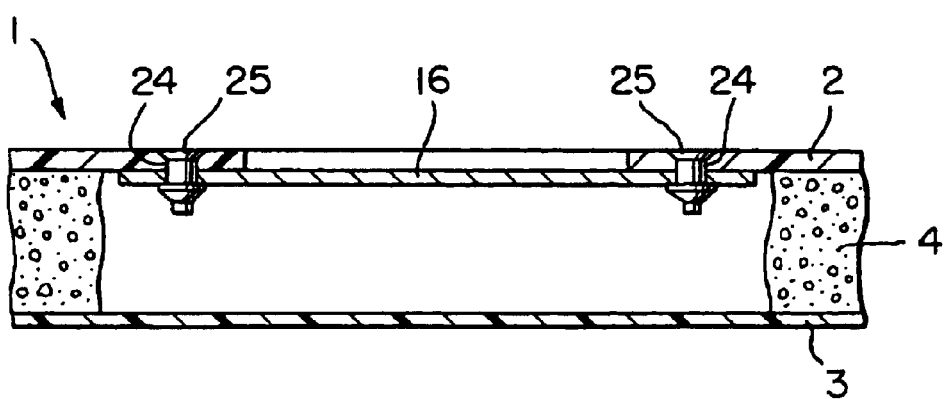
FIG. 10 is a fragmentary sectional view of the sandwich structure shown in FIG. 9.

After the desired portions of the core 4 have been removed, a support plate 16 is inserted in a hole formed in the sandwich structure 1 as shown in FIGS. 9 and 10. The support plate 16 is an expandable plate having a circular central part 17 and rectangular radial arms 18 (eight radial arms in this embodiment) like petals of a flower as shown in FIG. 9. The support plate 16 is made of, for example, a titanium alloy. The support plate 16 can be formed by punching a titanium alloy sheet. The diameter of the circular central part 17 is smaller than that of the opening 10. The diameter of an imaginary circle circumscribed about the support plate 16 is far greater than that of the opening 10.

The support plate 16 is inserted through the opening 10 in the space formed by removing the portions of the core 4. When inserting the support plate 16 in the space, the arms 18 are curved inward and the arms 18 are extended in the space after the support plate 16 has been entirely inserted into the space. Subsequently, through holes 24 for passing rivets 25 are formed through the outer surface plate 2 and the arms 18 with a drill. The through holes 24 may be formed in the outer surface plate 2 and the arms 18 before inserting the support plate 16 into the space. The arms 18 are fastened to the inner surface of a portion of the outer surface plate 2 around the edge of the opening 10 with the rivets 25 as shown in FIG. 10.

Figure 11:
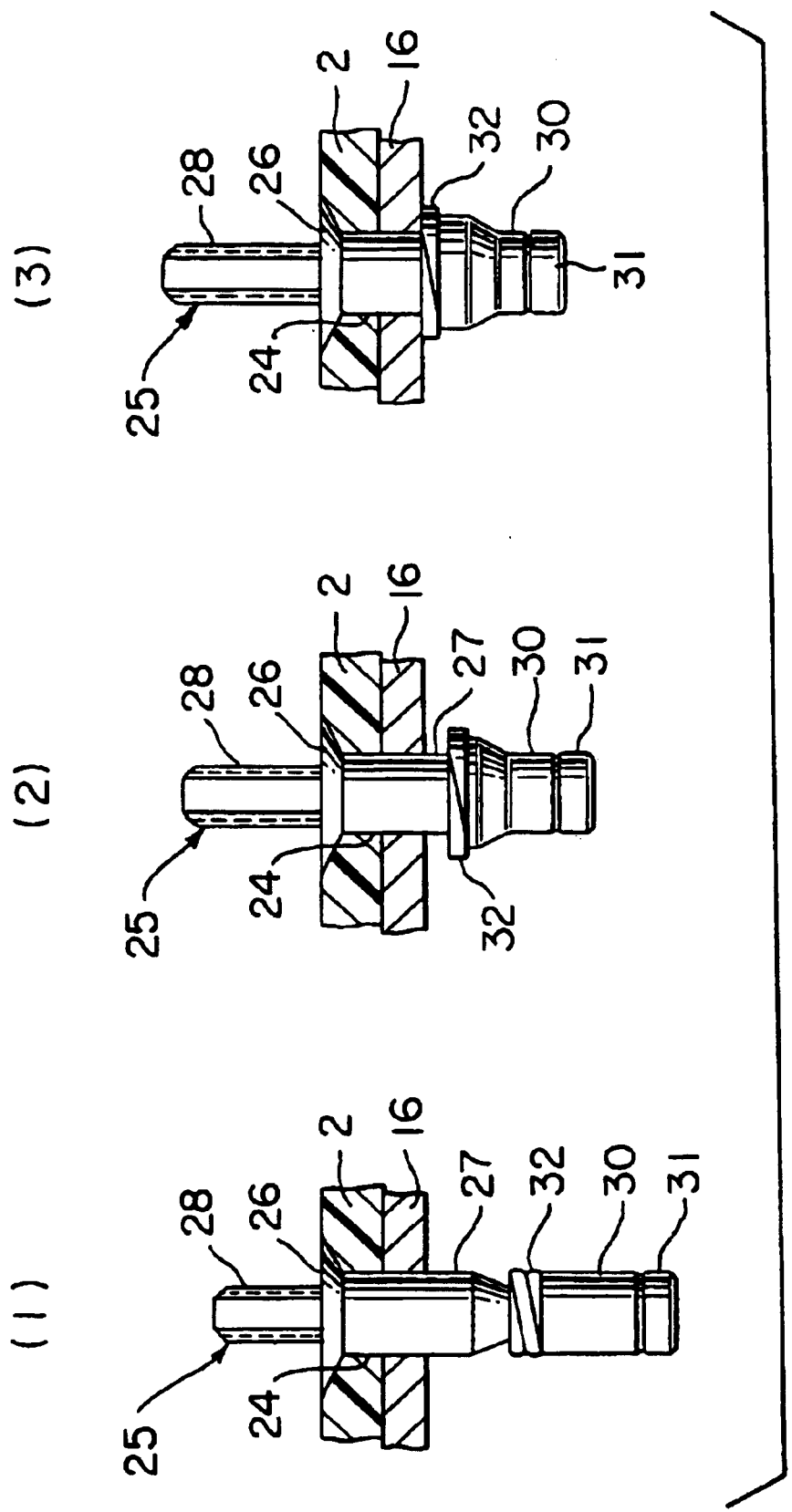
FIG. 11 is a sectional view of assistance in explaining a riveting method.

Referring to FIG. 11, the rivets 25 are blind rivets that can be staked from one side thereof. Each rivet 25 has a countersunk flat head 26 that can be set flush with the outer surface of the outer surface plate 2. The rivet 25 has a hollow rod 27 and a draw bar 28 inserted in the hollow rod 27. A sleeve 30 is put on an inner end portion of the draw bar 28 projecting from the hollow rod 27, and the inner end of the draw bar 28 is connected to a solid bolt 31 formed at the extremity of the sleeve 30. A coiled washer 32 is disposed on the base end of the sleeve 30. An inner end portion of the hollow rod 27 is tapered.

As shown in FIG. 11(1), the rivet 25 is inserted from the outside of the outer surface plate 2 in the through holes 24 formed in the outer surface plate 2 and the arm 18, and then the draw bar 28 is pulled outward by a tool. Then, the coiled washer 32 is uncoiled and expanded by the tapered inner end portion of the hollow rod 27 as shown in FIG. 11(2). As the draw bar 28 is pulled further outward, the coiled washer 32 is brought into contact with the inner surface of the arm 18 of the support plate 16 and the sleeve 30 is fully staked. Then, a portion of the draw bar 28 projecting outward from the head 26 is cutoff. Thus, the eight arms 18 of the support plate 16 are fastened to the outer surface plate 2 with the rivets 25.

Figure 12:
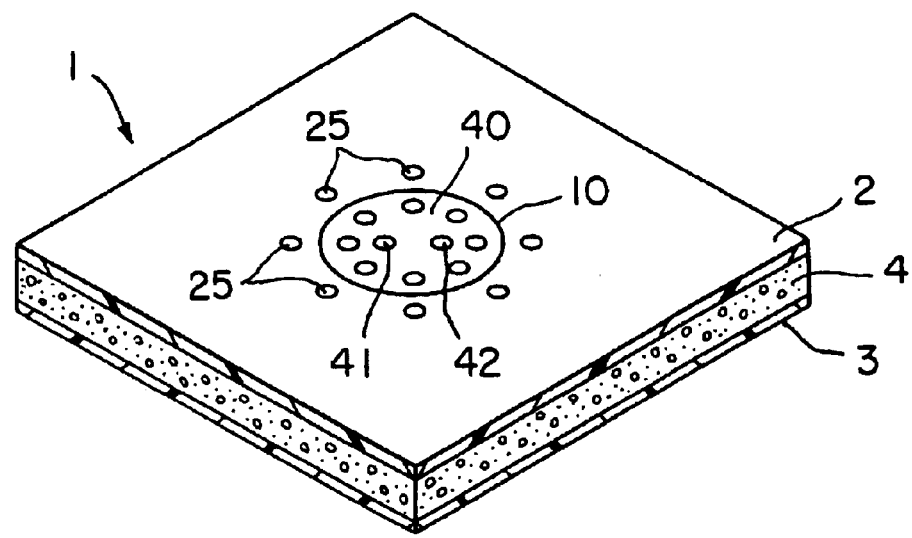
FIG. 12 is a perspective view of a repaired sandwich structure provided with a cover plate.

Subsequently, a cover plate 40 is seated on the support plate 16 in the opening 10 as shown in FIG. 12. The cover plate 40 is a circular plate formed by cutting a plate of the same fiber-reinforced composite material as that forming the outer surface plate 2 with the hole saw 11. Since the circular central part 17 of the support plate 16 lies in the opening 10 and the arms 18 are fastened to the inner surface of the outer surface plate 2, the cover plate 40 is seated on the circular central part 17. Then, eight through holes are formed through the cover plate 40 and the support plate 16 with a drill at eight positions corresponding to the eight arms 18. Blind rivets 25 are inserted in the through holes and are staked by the same method as that mentioned above to fasten the cover plate 40 to the circular central part 17 with the rivets 25. Since the thickness of the cover plate 40 is equal to that of the outer surface plate 2, the outer surface of the cover plate 40 fastened to the support plate 16 is flush with the outer surface of the outer surface plate 2.

Figure 13:
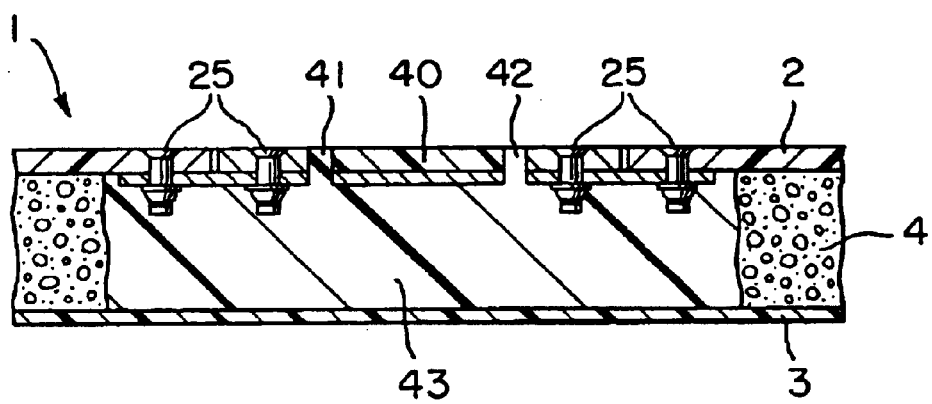
FIG. 13 is a fragmentary sectional view of a repaired sandwich structure having a hollow filled up with a filling material.

After the cover plate 40 has been thus fastened to the support plate 16 with the rivet 25, two through holes 41 and 42 are formed through the cover plate 40 and the support plate 16. A filling material 43 is injected through the through hole 41 into the space formed in the sandwich structure 1 by means of an injection gun. The filling material 43 is a liquid foaming resin containing minute bubbles. The space formed by removing the portions of the core 4 is filled up with the filling material 43 as shown in FIG. 13. After the space has been fully filled with the filling material 43, the filling material 43 overflows through the other through hole 42, which indicates that the space has been fully filled with the filling material 43. The filling material 43 injected into the space sets perfectly in a predetermined time. The filling material 43 sets at an ordinary temperature.

Thus, the damaged sandwich structure 1 can be easily repaired by using the rivets 25 without requiring any special devices. The titanium alloy forming the support plate 16 has a coefficient of thermal expansion nearer to that of the fiber-reinforced composite material forming the surface plates 2 and 3 than those of aluminum alloys. Therefore, an excessively high thermal stress will not be induced in the support plate 16 while the sandwich structure 1 is in use even though the support plate 16 is fastened to the outer surface plate 2 with the rivets 25.

The sandwich structure repairing method may use a support means other than the support plate 16 having the radial arms 18. For example, a plurality of support plates may be fastened to the inner surface of a portion of the outer surface plate 2 around the edge of the opening 10 with rivets so as to protrude into the opening 10, and the cover plate 40 may be placed on and fastened with rivets to the support plates.

When repairing work can be performed on the side of the inner surface plate 3, a cylindrical portion of the sandwich structure 1 including portions of the outer surface plate 2, the core 4 and the inner surface plate 3 may be removed with the hole saw 11 to form a cylindrical space extending through the sandwich structure 1. The cylindrical space permits the repairing work to be performed on both the outer and the inner side of the sandwich structure 1 and facilitates the work for removing a portion of the core 4 around the edge of the opening in the outer surface plate 2. Since the inner surface of the sandwich structure 1 is out of view and need not be entirely flat, a cover plate of a diameter greater than that of an opening formed in the back surface plate 3 may be fastened with rivets directly to the inner surface plate 3 so as to cover the opening in the inner surface plate 3.

Figure 14:
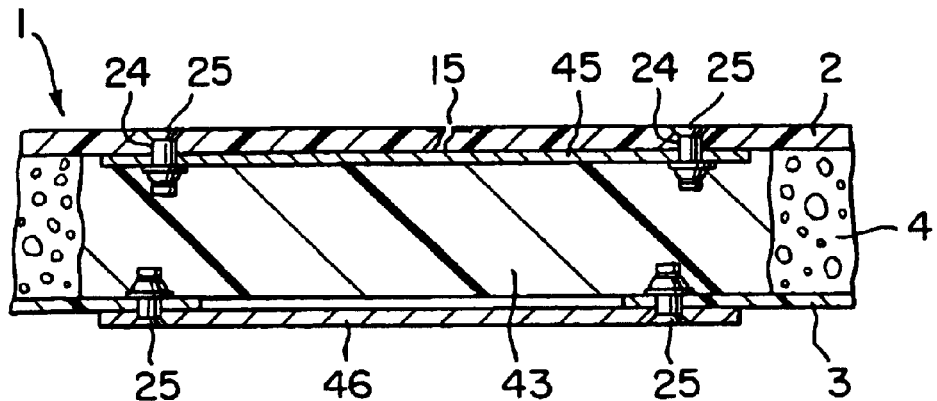
FIG. 14 is a fragmentary sectional view of assistance in explaining another sandwich structure repairing method according to the present invention.

A sandwich-structure repairing method in a sixth embodiment according to the present invention will be explained hereinafter with reference to FIG. 14, in which parts like or corresponding to those shown in FIGS. 5 to 13 are denoted by the same reference characters and the description thereof will be omitted.

The sandwich structure repairing method is used when repairing work can be performed on the side of an inner surface plate 3 of a sandwich structure 1. The sandwich structure 1 has a flaw 5 in an outer surface plate 2 thereof. A portion of the inner surface plate 3 corresponding to a portion of the outer surface plate 2 having the flaw 5 is removed with a hole saw 11 to form an opening, and a portion of a core 4 corresponding to the portion having the flaw 5 is removed by shot blasting as mentioned above. A mending plate (as an outer support plate) 45 is put on the inner surface of the portion of the outer surface plate 2 having the flaw 5 and is fastened to the outer surface plate 2 with rivets 25. The mending plate 45 is formed of a titanium alloy or the same fiber-reinforced composite material as that forming the outer surface plate 2. Then, a space formed by removing a portion of the core 4 is filled up with a filling material 43 and a cover plate (as an inner support plate) 46 is fastened to the inner surface plate 3 with rivets 25 so as to cover the opening formed in the inner surface plate 3. Thus, any opening does not need to be formed in the outer surface plate 2.

This sandwich structure repairing method is applicable not only to repairing a sandwich structure provided with only a foam plastic core, but also to repairing sandwich structures provided with a core consisting of honeycomb core members and foam plastic core members as those shown in FIGS. 2 to 4.

According to the present invention, a sandwich structure includes a core having foam plastic core members of a closed-cell foam plastic material, and composite surface plates of a fiber-reinforced composite material containing hydrophobic inorganic fibers as reinforcing fibers and covering the opposite surfaces of the core, wherein the foam plastic core members are bonded together with an adhesive film that does not foam, and the composite surface plates are bonded to the core with adhesive films not containing any carrier or a component resin of the fiber-reinforced composite material forming the surface plates. Thus, the leakage of water into the sandwich structure can be prevented with reliability.

According to the present invention, a peripheral part of the core is formed of the foam plastic core members arranged so as to surround the honeycomb core members. Therefore, the sandwich structure has a high strength and a high rigidity.

According to the present invention, the core is formed by sandwiching the honeycomb core members between the foam plastic core members and bonding the foam plastic core members to the honeycomb core members with adhesive films not containing any carrier. Therefore, water is unable to penetrate into the sandwich structure and the sandwich structure has a high strength and a high rigidity.

According to the present invention, portions of the core corresponding to portions of the sandwich structure where thickness varies sharply are formed of the foam plastic core members and portions of the core corresponding to portions of the sandwich structure where thickness varies gradually are formed of the honeycomb core members. Therefore, the core can be easily processed and the composite surface plates can be easily bonded to the core.

According to the present invention, the sandwich structure repairing method puts the outer support plate to the inner surface of the outer surface plate and fastens the same to the outer surface plate with the rivets. Since the outer support plate is attached to the outer surface plate by riveting work using rivets for repair instead of bonding work using an adhesive that requires time and labor, time and labor necessary for repairing the sandwich structure can be greatly reduced.

According to the present invention, the sandwich structure repairing method removes a damaged portion of the outer surface plate to form an opening, attaches the outer support plate to the inner surface of a portion of the outer surface plate around the edge of the opening with the rivets, and fits the cover plate in the opening and fastens the same to the support plates. Thus, the sandwich structure can be repaired so that the outer surface thereof is flat and smooth.

According to the present invention, a portion of the foam plastic core member can be easily removed by shot blasting, which reduces repairing time greatly.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A sandwich structure comprising:
   a core having foam plastic core members formed of a closed-cell foam plastic material and honeycomb core members; and
   surface plates formed of a fiber-reinforced composite material containing hydrophobic inorganic fibers as reinforcing fibers and covering the opposite surfaces of the core;
   wherein a peripheral part of the core is formed of the foam plastic core members arranged so as to surround the honeycomb core members, the foam plastic core members are bonded together with adhesive films that do not foam, and the surface plates are bonded to the core with adhesive films not containing any carrier or a component resin of the fiber-reinforced composite material forming the surface plates.

2. The sandwich structure according to claim 1 to be used as a structural member of aircraft, rolling stock, an automobile or a ship.

3. A sandwich structure comprising:
   a core having foam plastic core members formed of a closed-cell foam plastic material and honeycomb core members; and
   surface plates formed of a fiber-reinforced composite material containing hydrophobic inorganic fibers as reinforcing fibers and covering the opposite surfaces of the core;
   wherein portions of the core corresponding to portions of the sandwich structure where thickness varies sharply are formed of the foam plastic core members, portions of the core corresponding to portions of the sandwich structure where thickness varies gradually are formed of the honeycomb core members, and the surface plates are bonded to the core with adhesive films not containing any carrier or a component resin of the fiber-reinforced composite material forming the surface plates.

4. The sandwich structure according to claim 3 to be used as a structural member of aircraft, rolling stock, an automobile or a ship.

5. A sandwich structure repairing method of repairing a sandwich structure comprising a core having foam plastic core members formed of a closed-cell foam plastic material, and an outer surface plate and an inner surface plate formed of a fiber-reinforced plastic material and bonded to the opposite surfaces of the core with adhesive films not containing any carrier or a component resin of the fiber-reinforced composite material forming the surface plates, said sandwich structure repairing method comprising the steps of:

putting an outer support plate to an inner surface of a damaged portion of the outer surface plate; and fastening the outer support plate to the outer surface plate with rivets.

6. The sandwich structure repairing method according to claim 5, wherein:

a portion of the inner surface plate and a portion of the core corresponding to the damaged portion of the outer surface plate are removed;

the outer support plate is fastened to the inner surface of the damaged portion of the outer surface plate with rivets;

a cavity formed by removing the portion of the core is filled up with a filling material; and an inner support plate of a size greater than that of an opening in the inner surface plate formed by removing the portion of the inner surface plate is fastened to the inner surface plate with rivets so as to cover the opening in the inner surface plate.

7. The sandwich structure repairing method according to claim 5, wherein:

an opening is formed in the damaged portion of the outer surface plate;

a portion of the core and a portion of the inner surface plate corresponding to the opening and a region around an edge of the opening are removed;

the outer support plate is fastened to the inner surface of a portion of the outer surface plate around an edge of the opening in the outer surface plate with rivets;

a cover plate formed of the same material as that forming the outer surface plate and having a thickness equal to that of the outer surface plate is fitted in the opening and is fastened to an outer support plate with rivets;

a cavity formed in the core by removing the portion of the core is filled up with a filling material; and an inner support plate of a size greater than that of an opening in the inner surface plate formed by removing the portion of the inner surface plate is fastened to the inner surface plate with rivets so as to cover the opening in the inner surface plate.

8. The sandwich structure repairing method according to claim 5, wherein:

a portion of the outer surface plate including the damaged portion is removed to form an opening in the outer surface plate;

a portion of the core corresponding to the opening in the outer surface plate and a portion of the core around an edge of the opening in the outer surface plate are removed;

the outer support plate is expandable over a region greater than the opening in the outer surface plate;

the outer support plate is inserted through the opening in the outer surface plate;

the outer support plate is fastened to the inner surface of the outer surface plate with rivets;

a cover plate of a size equal to that of the opening formed in the outer surface plate and of a thickness equal to that of the outer surface plate is fitted in the opening in the outer surface plate;

the outer support plate is fastened to the support plate with rivets; and a cavity formed by removing the portions of the core is filled up with a filling material.

9. The sandwich structure repairing method according to claim 5, wherein:

a plurality of the outer support plates is used;

a portion of the outer surface plate including the damaged portion is removed to form an opening in the outer surface plate;

a portion of the core corresponding to the opening in the outer surface plate and a portion of the core around an edge of the opening in the outer surface plate are removed;

the plurality of the outer support plate are inserted through the opening in the outer surface plate so as to be arranged on the inner surface of a portion of the outer surface plate around an edge of the opening in the outer surface plate;

the plurality of the outer support plates is fastened to the inner surface of the outer surface plate with rivets;

a cover plate of a size equal to that of the opening formed in the outer surface plate and of a thickness equal to that of the outer surface plate is fitted in the opening in the outer surface plate;

the cover plate is fastened to the plurality of the outer support plates with rivets; and a cavity formed by removing the portions of the core is filled up with a filling material.

10. The sandwich structure repairing method according to claim 5, wherein the portion of the core of a foam plastic material is removed by a shot blasting process.

11. The sandwich structure repairing method according to claim 6, wherein the portion of the core of a foam plastic material is removed by a shot blasting process.

12. The sandwich structure repairing method according to claim 7, wherein the portion of the core of a foam plastic material is removed by a shot blasting process.

13. The sandwich structure repairing method according to claim 8, wherein the portion of the core of a foam plastic material is removed by a shot blasting process.

14. The sandwich structure repairing method according to claim 9, wherein the portion of the core of a foam plastic material is removed by a shot blasting process.

* * * * *